United States Patent [19]
Fischer et al.

[11] Patent Number: 5,174,969
[45] Date of Patent: Dec. 29, 1992

[54] ROLL-PACK DIESEL PARTICULATE FILTER

[75] Inventors: Edward M. Fischer, White Bear lake; Donald D. Johnson, Chisago City; Stephen M. Sanocki, Stillwater, all of Minn.

[73] Assignee: Minnesota Mining and Manufacturing Company, St. Paul, Minn.

[21] Appl. No.: 681,150

[22] Filed: Apr. 5, 1991

[51] Int. Cl.⁵ .................. B01D 50/00; B01D 53/34
[52] U.S. Cl. .................. 422/180; 422/177; 422/211; 422/222; 55/484; 55/486; 55/523; 55/527; 55/DIG. 10; 55/DIG.30
[58] Field of Search ............ 55/484, 486, 523, 527, 55/DIG. 10, DIG. 30; 422/171, 174, 180, 181, 211, 222, 177

[56] References Cited

U.S. PATENT DOCUMENTS

| | | | |
|---|---|---|---|
| 3,869,267 | 3/1975 | Gaylor | 55/492 |
| 3,920,428 | 11/1975 | Kinsley, Jr. | 55/DIG. 30 |
| 4,264,346 | 4/1981 | Mann | 55/523 |
| 4,276,071 | 6/1981 | Outland | 55/523 |
| 4,324,572 | 4/1982 | Erdmannsdorfer | 55/385 |
| 4,376,637 | 3/1983 | Yang | 55/2 |
| 4,427,418 | 1/1984 | Kogiso et al. | 55/287 |
| 4,456,457 | 6/1984 | Nozawa et al. | 55/283 |
| 4,543,113 | 9/1985 | Forester et al. | 55/527 |
| 4,576,799 | 3/1986 | Worner | 422/176 |
| 4,613,350 | 9/1986 | Forester et al. | 55/527 |
| 4,813,231 | 3/1989 | Bykowski | 60/274 |
| 4,940,476 | 7/1990 | Buck | 55/486 |
| 5,042,249 | 8/1991 | Erdmannsdoerfer | 60/299 |

FOREIGN PATENT DOCUMENTS

| | | |
|---|---|---|
| 0275372 | 1/1990 | European Pat. Off. . |
| 3545762 | 7/1987 | Fed. Rep. of Germany . |
| 3731766 | 3/1989 | Fed. Rep. of Germany . |
| 3800723 | 7/1989 | Fed. Rep. of Germany . |
| 3801634 | 8/1989 | Fed. Rep. of Germany . |
| 3806131 | 8/1989 | Fed. Rep. of Germany . |
| 3910554 | 10/1989 | Fed. Rep. of Germany . |
| 3823205 | 1/1990 | Fed. Rep. of Germany . |
| 2193656 | 2/1988 | United Kingdom . |

OTHER PUBLICATIONS

Japanese Abstract No. 56-46405 (Sumiyoshi), published Oct. 7, 1982.

SAE Technical Paper Series, 870015, titled "Experiences in the Development of Ceramic Fiber Coil Particulate Traps," 1987, H. O. Hardenberg and H. L. Daudel, pp. 67-78.

SAE Technical Paper Series, 870011, titled "Urban Bus Application of a Ceramic Fiber Coil Particualte Trap," H. O. Hardenberg, pp. 17-25.

*Primary Examiner*—Lynn M. Kummert
*Attorney, Agent, or Firm*—Gary L. Griswold; Walter N. Kirn; Gerald F. Chernivec

[57] ABSTRACT

An efficient, economical, compact diesel particulate filter comprising a casing radially filled with a bundle of tubes comprising woven, braided, or knitted inorganic yarn, wherein each tube is at least about twice the length of the bundle, and is folded at one end to prevent exhaust from traveling through the hollow of the tube without passing through its wall.

52 Claims, 2 Drawing Sheets

ROLL-PACK DIESEL PARTICULATE FILTER

FIELD OF THE INVENTION

This invention relates to filters or traps that remove particulates from the exhaust of diesel engines.

BACKGROUND ART

Diesel engines emit a hazardous, sooty exhaust that can be rendered less hazardous by using diesel particulate filters. Known diesel particulate filters, however, unduly increase fuel consumption and tend to have poor durability.

Known diesel particulate filters can be divided into four categories or types, wherein the first type is characterized by having a ceramic wallflow monolith, the second type having a rigid ceramic foam, the third type having a mass of fibrous filter material, and the fourth type having one or more hollow, perforated, metal tubes. Each filter type can have an elongated tubular casing adapted for connection to an exhaust system. Further, each filter type can be periodically regenerated during use by burning off the collected particulate matter.

An example of a first-type diesel particulate filter is shown in U.S. Pat. No. 4,276,071 (Outland).

Offenlegungsschrift No. DE 38 06 131 (Giebling), laid open Aug. 31, 1989, describes a method of making a modified first-type diesel particulate filter, wherein a paste-like ceramic structural material bearing a mesh including parallel, spaced filaments is wound up into a roll that is inserted into a tubular casing and then fired to produce a porous ceramic soot-filter body.

Examples of second-type diesel particulate filters are shown in U.S. Pat. Nos. 4,264,346 (Mann) and 4,813,231 (Bykowski). A problem common to both the first and second type filters is that due to their rigid nature, they are prone to cracking when subjected to thermal stresses and vibrations, such as, for example, those encountered when the filters are used in automobiles or other vehicles.

One example of a third-type diesel particulate filter is disclosed in Offenlegungsschrift No. 35 45 762 (Brich) laid open Feb. 7, 1987, wherein woven mats are placed in a cylindrical housing so that they are coaxial with the centerline of the housing. The housing appears to have an axial gas inlet and an axial gas outlet. The exhaust gas appears to pass radially through the woven mats. In one embodiment, ceramic fiber mats are rolled up tightly and fill the entire cross-section of the housing. This embodiment optionally has a metallic web rolled together in a spiral fashion with the ceramic fiber mat so that they become enmeshed around the axis.

Offenlegungsschrift No. DE 38 01 634 (Stöpler et al.), laid open August 3, 1989, discloses a third-type diesel filter wherein several layers of cylindrical filter elements are arranged in a housing unit between an inlet and outlet funnel to be radially traversed by the exhaust gases, wherein the filter elements have an essentially circular or oval cross-section with an equidistant radial spacing under the formation of inlet and outlet channels, and wherein each filter element comprises a gas-permeable filter-body of wire-mesh, ceramic fibers, or a combination thereof, enclosed at both sides by a gas-permeable metallic cover-sheet. Further, by using spacer elements, the filter-body can be wound to form a wrapper with a spiral inlet and outlet channel, each closed at the opposite side, wherein the enclosing covers formed by perforated metallic sheets or metallic weaves are provided with a catalytic coating for converting the gaseous pollutants.

An example of a fourth-type diesel particulate filter is shown in U.S. Pat. No. 4,324,572 (Erdmannsdörfer), wherein a plurality of parallel, spaced, rigid, perforated, hollow tubes (designated "support pipes") extend substantially the length of the casing. Threads of spun silicon dioxide or silica fiber are wound on each of the tubes to provide filtering elements. Each tube is plugged at the inlet, while channels between the tubes are blocked by a wall at the outlet, forcing the exhaust to pass through the filtering elements. The threads are said to preferably be cross-wound to allow oxygen to reach the soot deposits during periodic burn-off of collected particulate matter.

Offenlegungsschrift No. DE 37 31 766 (Buck), laid open Mar. 30, 1989, discloses another fourth-type diesel particulate filter having an enclosure with an inlet and outlet connection pipe, wherein ceramic fibers or yarns are placed inside the enclosure.

U.S. Pat. No. 4,576,799 (Wörner), discloses yet another fourth-type diesel particulate filter comprising a plurality of parallel, spaced, rigid, perforated, hollow tubes substantially filling an elongated casing radially and concentrically. Each of the tubes consists of a filtering element sandwiched between an inner perforated shell and an outer perforated wall. In one embodiment, there is a barrier between adjacent tubes so that exhaust entering between two of the tubes passes radially outwardly through the filtering element before exiting through the space between the outer of those two tubes and the next barrier. In another embodiment, there are two tubes between adjacent barriers, such that the exhaust passes through the filtering elements of both tubes before reaching the outlet.

A fourth-type diesel particulate filter is also disclosed in Offenlegungsschrift No. DE 39 10 554 (Engeler et al.), laid open Oct. 19, 1989, wherein the filter comprises four concentric, rigid, hollow, perforated tubes extending substantially the length of the casing, with each space between adjacent tubes being blocked at only one end of the tubes so that exhaust entering an unblocked space passes radially inwardly or outwardly through the perforated walls of the tubes.

U.K. Pat. Appln. No. GB 2,193,656 (Henkel), published Feb. 17, 1988, discloses a fourth-type diesel particulate filter that has only one perforated hollow tube, wherein the tube is wrapped with two filtering layers, first a fine-pore woven fabric of quartz glass or ceramic fibers and then an elastic wide-mesh fabric or fleece.

A common problem associated with a fourth-type of diesel particulate filter that employs short or staple fibrous filter material is that it tends to experience fiber shedding resulting in an undesirably short life.

SUMMARY OF THE INVENTION

Briefly, the present invention provides a diesel particulate filter comprising
 (a) a casing having an inlet end and an outlet end;
 (b) means for connecting the ends of the casing to an exhaust system; and
 (c) a filtering element substantially radially filling the casing, said filtering element comprising
  (i) a bundle of parallel tubes (i.e., hollow cylinders), each tube comprising one of woven, braided, and knitted inorganic yarn, the tubes extending between the ends of the casing, (ii) means for restricting flow of exhaust along channels between adjacent tubes and between the filtering element and the casing.

The filter of the present invention can be characterized as an improved third-type diesel particulate filter. The filter provides an efficient and durable diesel particulate filter, which is economical to manufacture.

Preferably, the tubes comprise a continuous inorganic yarn that is more resistant to fiber shedding than are filter materials made from short or staple ceramic fibers.

The tubes of the filtering element can be formed into a flat-style fabric that incorporates a substantially continuous tubing comprising one of woven, braided, and knitted inorganic yarn, wherein the tubing extends back-and-forth across the fabric in straight parallel segments and is folded at each side of the fabric. The tubing can be held in that zig-zag pattern by, e.g., being interwoven with a warp or by being placed in contact with pressure-sensitive sheet or scrim material. Useful materials for the warp include, for example, inorganic yarns, organic yarns, and fibrillated organic films. Useful pressure-sensitive sheet materials include, for example, masking tape, transfer tape, and transfer film (commercially available under the trademarked designation "SCOTCH MASKING TAPE", "SCOTCH TRANSFER TAPE", and "SCOTCH TRANSFER FILM" from the 3M Co. of St. Paul, Minn.).

In this application:

"inorganic fiber" refers to any inorganic-based fiber which is resistant to high temperature (e.g., temperatures above about 600° C.), is chemically resistant to diesel exhaust gas, and has textile qualities (i.e., is suitable for making the inventive filter);

"yarn" means a plurality or bundle of individual fibers or filaments;

"heat-fugitive fiber" refers to a fiber comprising constituents which decompose and volatilize when heated (e.g., organic material); and "fiber segment" refers to the portion of a broken fiber protruding from the core of the yarn;

"fibrillated film" refers to yarns produced by mechanically or ultrasonically separating lineal fibers from oriented extruded film.

BRIEF DESCRIPTION OF THE DRAWING

The invention may be more easily understood in reference to the drawing, all figures of which are schematic. In the drawing.

DESCRIPTION OF THE PREFERRED EMBODIMENTS

The diesel particulate filter according to the present invention provides an efficient, economical, compact system for removing particulate from diesel exhaust.

Figure 1:
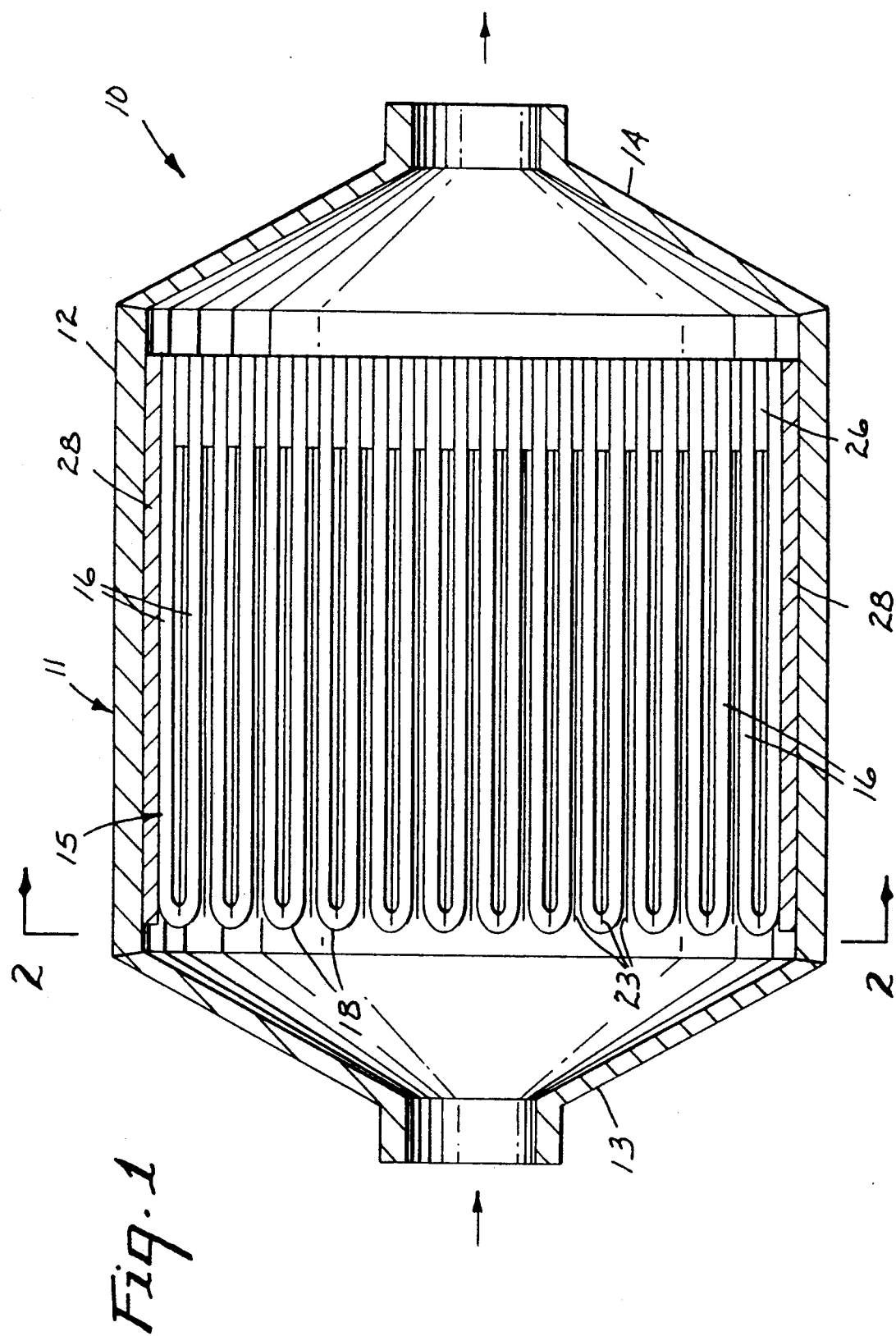
FIG. 1 is a longitudinal central section through a diesel particulate filter according to the invention.
Figure 2:
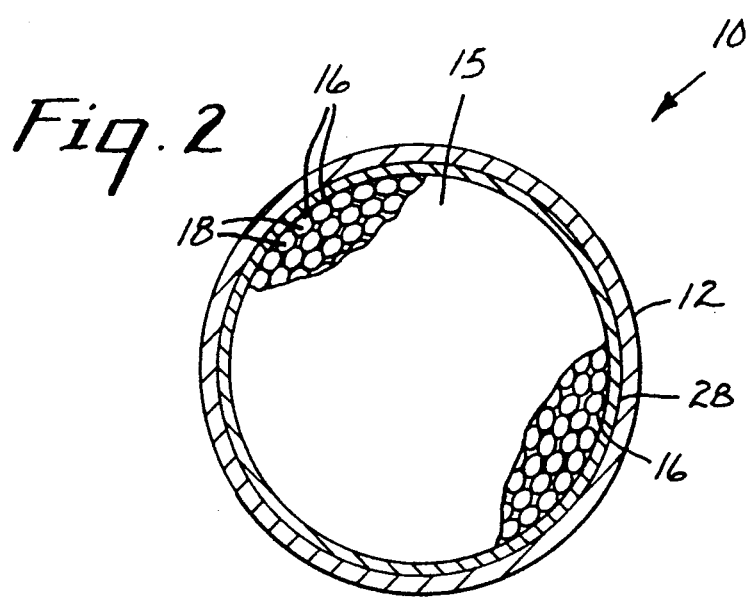
FIG. 2 is a cross section along line 2—2 of FIG. 1.

Referring to FIGS. 1 and 2, diesel particulate filter 10 comprises casing 11 comprising cylindrical body 12, conical exhaust inlet 13, and conical exhaust outlet 14. Filling cylindrical body 12 is filtering element 15 comprising bundle of tubes 16, wherein each tube comprises one of woven, braided, or knitted inorganic yarn, and wherein the tubes extend between the inlet and outlet ends of cylindrical body 12, and wherein the tubes are substantially parallel to each other. Each of braided tubes 16 are integral with an adjacent tube, open at the end of the bundle adjacent outlet 14, and blocked at the other end by fold 18. Extending the length of channels between adjacent tubes are inorganic yarns 23.

Figure 3:
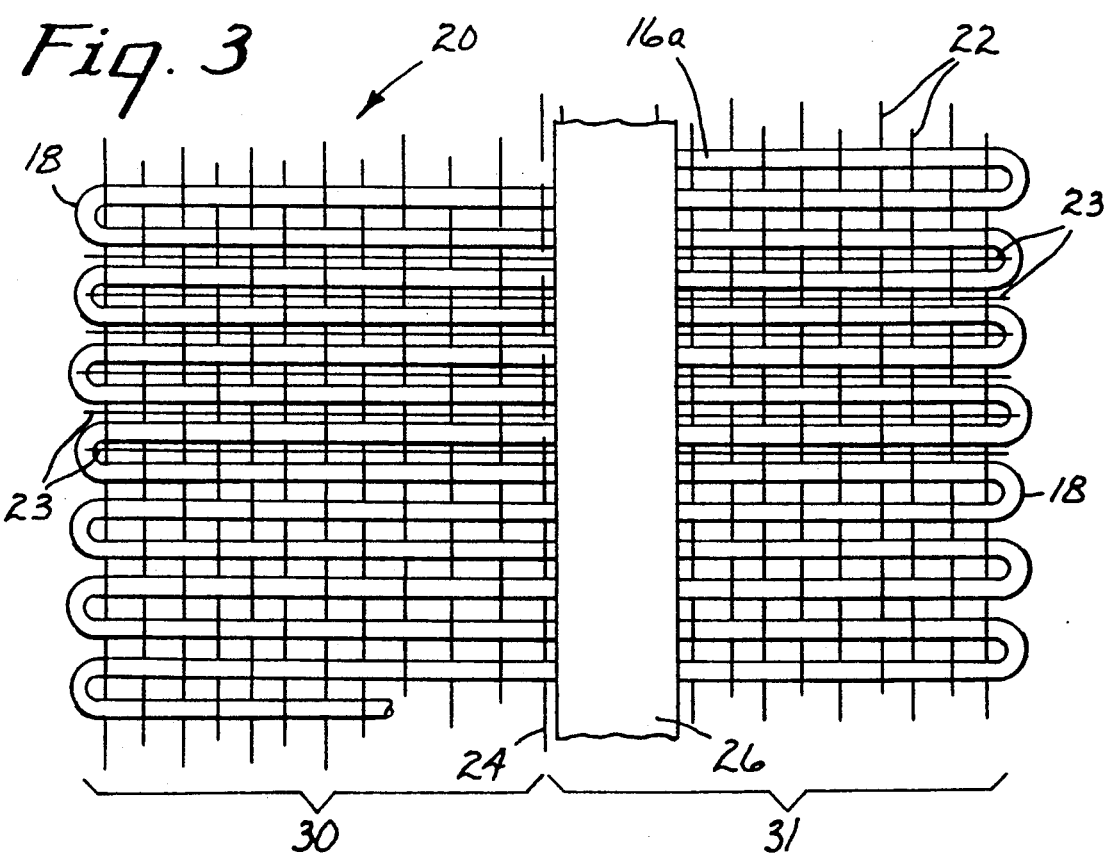
FIG. 3 is a plan view of a portion of a fabric used in making a filtering element for the diesel particulate filter shown in FIGS. 1 and 2.

Referring to FIG. 3, filtering element comprises flat-style fabric 20. Flat-style fabric 20 comprises a warp of inorganic yarns 22, and long braided tubing 16A that extends back-and-forth across the fabric in straight parallel segments and is folded at each side of the fabric. Extending the length of channels between adjacent tubes are inorganic yarns 23.

Referring to FIG. 3, fabric 20 is preferably slit centrally along dashed line 24, dividing the fabric into strips 30 and 31, wherein tubes 16A of each strip are open at one edge of the strip and are blocked by folds 18 at the opposite edge.

In a preferred embodiment, a narrow piece of inorganic nonwoven mat 26 is laid along the edge of a strip adjacent the open ends of tubes 16A to provide a stuffer.

To provide a filter, fabric 20 and nonwoven mat 26 are spirally wound together into a roll. Referring to FIGS. 1 and 2, the exterior surface of the roll is covered with intumescent mat 28. The resulting assembly, which should fit snugly into the cylindrical body, is inserted into cylindrical body 12. Optionally, intumescent mat 28 is expanded by heating prior to or during the first use of diesel particulate filter 10, becoming securely held by casing 11.

The size of the inventive filter depends on the particular filter demands and size of the diesel engine. In general, the cost of the filter increases with size. On the other hand, a filter having a filter element too small for a particular application may provide poor filtering of the exhaust gas.

The casing and blocking means can independently comprise any suitable material including, for example, metals or ceramics. For ease of manufacture, the preferred material is a metal. Preferably, the metal is stainless steel sheet metal. Means for connecting the casing and blocking means include those known in the art for the particular material of which the casing and blocking means are comprised. For example, if the casing and blocking means are made of metal, the preferred means for connecting them is welding.

The shape of the casing can vary by convenience. Suitable shapes include, for example, those having a circular cross-section, an elliptical cross-section, a square cross-section, and a rectangular cross-section. For ease of inserting the filter element into the casing, the casing preferably has a circular or elliptical cross-section. The casing typically is elongated to allow it to have a slim profile.

The woven, braided, or knitted tubing can be formed using conventional weaving, braiding, or knitting techniques.

Means for restricting the flow of exhaust gas along channels between adjacent tubes can be provided, for example, by fillers extending the length of the channel. Fillers should be selected to enhance the filtering action without significant back pressure. Particularly useful fillers include, for example, inorganic fibers or inorganic yarn. The yarn or fiber can be woven along with the tubes into a flat-style fabric using conventional weaving techniques.

Preferably, the inorganic yarn has a diameter in the range from about 0.5 to about 6 mm. More preferably, the diameter is in the range from about 1 to about 3 mm. Yarn diameters in the specified ranges typically have superior textile qualities as compared to yarns with diameters outside of these ranges. Such yarns typically comprise in the range from about 420 to about 7800 individual inorganic fibers. Preferably, the inorganic yarn comprises in the range from about 1560 to about 4680 individual inorganic fibers.

Preferably, the inorganic yarn is ply-twisted because such a construction when texturized better maintains the original strength of the yarn than does inorganic yarn which is not ply-twisted.

The inorganic fibers preferably have a diameter in the range from about 5 to about 20 micrometers. More preferably, the inorganic fibers have a diameter in the range from about 7 to about 15 micrometers. Fibers having a diameter within the specified ranges generally are easier to make and texturize than are fibers having diameters substantially outside of these ranges. Further, fibers substantially below 5 micrometers in diameter tend to be easily damaged (i.e., broken) when texturized. Fibers substantially above 20 micrometers in diameter typically provide a filter which is less efficient than one comprising fibers having diameters within the specified ranges.

The inorganic fibers comprising the inorganic yarn are preferably ceramic. The ceramic fibers can be, for example, amorphous, polycrystalline, or a combination thereof.

Useful ceramic yarns include, for example, those comprising fibers made of alumina-boria-silica, alumina, silica, silicon carbide, and boron nitride. Preferably, the ceramic fiber comprises an alumina-boria-silica. To aid in handling, the yarns are typically sized using conventional sizing techniques. Alumina-boria-silica yarns are commercially available, for example, under the trade designations "NEXTEL 312 CERAMIC YARN" and "NEXTEL 440 CERAMIC YARN" from the 3M Co. of St. Paul, Minn.

Texturization of the inorganic yarn improves its filter or trapping efficiency. Preferably, the inorganic yarn is texturized such that it is lofty, e.g., by being texturized so that loops of continuous fibers, individual fiber segments or a combination thereof extend outwardly from a dense core. Loops of continuous fibers are most preferred. The inorganic yarn can be texturized by techniques known in the art including, for example, air jet or mechanical texturization. Air jet texturization is preferred because it generally provides a texturized yarn having fewer fiber segments and more fiber loops than does yarn texturized by the mechanical technique.

Preferably, the texturized inorganic yarn has a diameter in the range from about 1 to about 10 mm. More preferably, the diameter of the texturized inorganic yarn is in the range from about 3 to about 6 mm. The filtering or trapping efficiency of texturized yarn having a diameter in the specified ranges is generally superior to such yarns having diameters outside of these ranges.

Optionally, the flat-style fabric can be slit centrally between the folds to provide two strips, each containing a plurality of parallel tubes. Each of the tubes is integral with an adjacent tube, open adjacent one edge of the strip, and blocked by a fold at the other edge of the strip. A length of each of those strips can be spirally rolled or folded to provide a bundle that can be inserted into a casing such that the tubes extend between the ends of the casing.

An alternate diesel particulate filter embodiment according to the present invention comprises a filter element comprising short tubes comprising one of woven, braided, and knitted inorganic yarn, wherein each tube extends only from one edge of the filtering element to the other and is blocked by either end, e.g., by being pinched. Preferably, the unblocked ends of the tubes are adjacent the inlet end of the casing. More preferably, the unblocked ends of the tubes are adjacent the outlet end of the casing. The latter filter element arrangement typically provides better filtering efficiency than the former.

The warp or sheet or scrim by which the tubing is held in a zig-zag pattern can further comprise heat-fugitive materials that can be burned away during or prior to the first use of the novel diesel particulate filter. The spaces left by the burned away fugitive material can provide a reduced back pressure and an enhanced access of exhaust particulates to particulate-trapping areas of the filtering element.

Suitable heat-fugitive materials include, for example, polypropylene yarn (commercially available, for example, under the trademarked designation "HURCULON" from Hercules, Inc. of Magna, Utah) and rayon yarn (commercially available, for example, under the trade designation "RAYON YARN" from Avtex Fibers of Front Royal, Va.).

The filtering or trapping efficiency of the filter element can be enhanced by incorporating a stuffer therein, wherein the stuffer supplements the filtering function of the tubes and of the filter, if present. The stuffer is typically interleaved in the filter element by rolling or folding the tubes or flat-style fabric comprising the tubes together with the stuffer. Particularly useful stuffers include, for example, nonwoven mats comprising inorganic fibers. The nonwoven mat preferably is selected to allow a high degree of filtering efficiency without significant back pressure. Typically, the fibers comprising the nonwoven mat have a diameter up to about 6 micrometers. Preferably, the fibers comprising the nonwoven mat have a diameter up to about 3 micrometers, wherein fibers having such a diameter may be referred to as "microfibers." More preferably, the microfibers have a diameter in the range from about 1 to about 3 micrometers. A preferred nonwoven mat comprises ceramic blown fibers. Preferably, the ceramic microfibers are made of alumina-boria-silica, alumina-silica, alumina, silica, silicon carbide, or boron nitride. More preferably, the nonwoven mat comprises alumina-boria-silica blown microfibers.

Suitable nonwoven mats are commercially available, and include those marketed under the trademarked designations "ULTRAFIBER 312" and "ULTRAFIBER 440" from the 3M Co. and "SAFFIL LD MAT" from Imperial Chemicals, Inc. of Cheshire, U.K., "FIBERFRAX" from the Carborundum Co. of Niagara Falls, N.Y., and "INTERAM E-50" from the 3M Co.

The relative fineness and inherent large surface area of a nonwoven mat as compared to yarns of inorganic fiber, allows a filtering element comprising a nonwoven to be thinner than a filter element which does not utilize such a mat.

Materials useful for restricting the flow of exhaust gas along the channels between the filtering element and the casing include, for example, an intumescent mat and stuffers. The preferred means for restricting the flow along the channels between the filtering element and the casing is the intumescent mat. The intumescent mat is preferred, because when heated it expands allowing the filter element to be securely fixed within the casing. Intumescent mats are commercially available and include, for example, that marketed under the trademarked designation "INTERAM 2600, Series I" from the 3M Company.

The tubes, warp yarns, or filler can further comprise heat-fugitive yarn. The passageways left behind when the heat-fugitive yarns are burned away during or prior to the first use of the filter may provide both reduced back pressure and enhanced access to the filtering fibers. The fugitive yarn is particularly useful in tubes or filler amounts up to about 30 volume percent, based on the total volume of the inorganic yarn comprising the tubes or fillers and the heat-fugitive yarn.

The warp can comprise up to 100 volume percent organic yarns. Preferably, the warp comprises about 75 to about 100 volume percent organic yarn.

To aid in the oxidation of carbon and soluble organic constituents (e.g., hydrocarbons and carbon monoxide) of diesel exhaust soot particulates, the filter element can further comprise an oxidation catalyst coated onto the inorganic yarn, inorganic nonwoven mat, or a combination thereof. Such oxidation catalysts are known in the art and include, for example, precious metals (e.g., platinum, rhodium, other platinum group metals, and silver) and base metals (e.g., copper, iron, maganese, and potassium). Methods for coating the catalyst onto the inorganic yarn and nonwoven mat are known in the art.

Optionally, the inventive diesel particulate filter further comprises means for periodic burnoff of accumulated particles, e.g., by periodically heating the exhaust to a temperature above the combustion point of the trapped particulate matter. Useful electrical combustion techniques are taught in European patent application Publ. No. 0,275,372 (Gürtler et al.), laid open Jan. 3, 1990, the disclosure of which is incorporated herein by reference.

Another means for periodic burnoff of accumulated particles is disclosed in assignee's co-pending application entitled "Electrically Regenerable Diesel Particulate Trap", U.S. Ser. No. 07/680,812, filed the same date as this application, the disclosure of which is incorporated herein by reference.

The accumulated particles can also be burned away by heating the filter in an oven (e.g., in an air atmosphere at a temperature in the range from about 550° C. to about 900° C. for a time period typically in the range from about 1 to about 2 hours) or by connecting a gas burner to the inlet end.

Objects and advantages of this invention are further illustrated by the following examples, but the particular materials and amounts thereof recited in these examples, as well as other conditions and details, should not be construed to unduly limit this invention.

EXAMPLE 1

A diesel particulate filter substantially as shown in FIGS. 1 and 2 was constructed. The 19.5 cm long cylindrical body having an inside diameter of about 12.5 cm was made of 4 mm thick 304 stainless steel sheet material. The braided tubing comprising the flat-style fabric was made by braiding a ⅛, 2.7z, 900 denier alumina-boria-silica ceramic yarn (commercially available under the trademarked designation "NEXTEL 312 CERAMIC YARN" from the 3M Co.) on a conventional 24 carrier braiding machine. The braided tubing had an outside diameter of about 3.2 mm and an inside diameter of about 1.6 mm. The warp comprising the flat-style fabric was a ⅛, 1.5z, 1800 denier alumina-boria-silica yarn (NEXTEL TM 312 CERAMIC YARN) which had been texturized using an air jet texturizing machine (commercially available under the trade designation "MODEL 17 SIDEWINDER" with a "MODEL 52D JET" from Enterprise Machine and Development Co. of New Castle, Del.). The speed of the texturizing machine was set at about 26.5 meters per minute. The jet was opened about ¾ of a turn from its most closed position. The air pressure was set at about 690 kPa.

The braided tubing and warp were woven together using a conventional weaving loom (commercially available under the trade designation "IWER LOOM" from Iwer Co. of Spain) to provide a twill weave flat-style fabric having about 2.5 braided tubes per centimeter. The size of the flat-style fabric comprising the filtering element was about 17 cm wide, about 345 cm long, and about 4 mm thick.

The nonwoven mat comprising the filtering element was a nonwoven ceramic mat comprising alumina-boria-silica microfibers (commercially available under the trademarked designation "NEXTEL 312 ULTRAFIBERS" from the 3M Co.). The size of the nonwoven mat was about 5 cm wide and about 345 cm long.

The diesel particulate filter was connected to one bank of a dual exhaust system of a 6.2-liter diesel engine incorporated into a truck (1984 Chevrolet Suburban). The truck was driven for about 55 minutes over a distance of about 90 km, at an engine speed of about 1750 RPM.

The particle trapping efficiency of the filter was measured using conventional multiple batch filter sampling at the inlet (i.e., upstream) and outlet (i.e., downstream) of the filter, using the filter handling procedures outlined in 40 CFR §86.1339-88 (1989], the disclosure of which is incorporated herein by reference. The membrane filters used were 47 mm in diameter (commercially available under the trademarked designation "PALLFLEX TEFLON MEMBRANE FILTERS" from Pallflex Products Corp. of Putnam, Conn.).

The pressure which the diesel particulate filter was subjected to was measured before and after the road test using a conventional flow bench having a blower with an adjustable air flow and having a connection pipe about 5 cm in diameter. The back pressure both before and after the test was about 64.5 and about 193 cm of water, respectively. The amount of soot collected was about 6.5 grams, as determined by weighing the filter before and after the test.

To calculate the efficiency of the diesel particulate filter, the mass concentration of the downstream sample (i.e., the amount of soot in the downstream membrane filter divided by the volume of the sample) was divided by the mass concentration of the upstream sample (i.e., the amount of soot in the upstream membrane filter divided by the volume of the sample). This quotient was subtracted from unity and the result multiplied by 100. The efficiency at the end of the test was about 70%, at an exhaust flow rate of about 2.3 $m^3$/min.

The filter was regenerated (i.e., the collected soot was burned out) by attaching the inlet end to a gas burner commercially available under the trademarked designation "PARKER BURNER" from Parker Hannifin Corp. of Cleveland, Ohio. The gas burner was ignited, providing an inlet temperature of about 900° C. After about 2 to 3 minutes, the gas burner was turned off. The back pressure across the regenerated filter was about 67 cm of water.

The diesel particulate filter was again loaded with soot as described above. The soot was burned out of the filter by placing it in an oven and heating it at about 600° C. for about 3 hours. The back pressure across the regenerated filter was about 67 cm of water.

These results show the diesel particulate filter of Example 1 was efficient and was effective in removing soot from the exhaust of a diesel engine.

EXAMPLE 2

A diesel particulate filter substantially as shown in FIGS. 1 and 2 was constructed as described in Example 1, with the following exceptions. The inside diameter of the cylindrical body was about 15.5 cm. The braided tubing comprised about 75 volume percent of a ½, 2.7z, 900 denier alumina-boria-silica ceramic yarn (NEXTEL ® 312 CERAMIC YARN) and about 25 volume percent ½, 1.0z, 840 denier polypropylene yarn (commercially available under the trademarked designation "HURCULON" from Hercules, Inc. of Magna, Utah), based on the total solid volume of the braided tubing. The braided tubing and warp were woven to provide a plain weave flat-style fabric about 830 cm long and about 16.5 cm wide. A stuffer (i.e., a nonwoven mat) was not used in constructing the filter of Example 2.

The filter was tested as described in Example 1, except the truck was driven for about 240 minutes over a distance of about 360 km. The amount of soot collected, which was about 24 grams, was determined by weighing the filter before and after the test. The back pressure at the beginning and end of the test was about 38 and about 127 cm of water, respectively.

The efficiency of the filter at the beginning and end of the test was about 71% and about 77%, respectively, at an exhaust flow rate of about 2.3 $m^3$/min.

The results show the diesel particulate filter of Example 2 was efficient and was effective in removing soot from the exhaust of a diesel engine.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A diesel particulate filter comprising
   (a) a casing having an inlet end and an outlet end;
   (b) means for connecting said ends of said casing to an exhaust system; and
   (c) a filtering element substantially radially filling said casing, said filtering element comprising
      (i) a plurality of parallel, hollow tubes, each tube comprising one of woven, braided, or knitted inorganic yarn, said tubes extending between said ends of said casing in layers, said tubes being open at one of said inlet and said outlet end of said casing, and said tubes being integral in pairs by means of a fold; and
      (ii) means for restricting flow of exhaust along channels between adjacent ones of said parallel tubes and between said filtering element and said casing.

2. The diesel particulate filter according to claim 1 wherein all of said tubes are open at said outlet end of said casing and wherein all of said tubes are blocked at said inlet end of said casing.

3. The diesel particulate filter according to claim 1 wherein each fold is at said inlet end of said casing.

4. The diesel particulate filter according to claim 1 wherein said hollow tubes incorporate heat-fugitive yarn in an amount up to about 30 volume percent, based on the total volume of said inorganic yarn and said heat-fugitive yarn comprising said tubes.

5. The diesel particulate filter according to claim 1 wherein said means for restricting said flow of exhaust along said channels between adjacent tubes comprises an inorganic filler, said inorganic filler filling the length of said channels within a layer of said plurality of tubes.

6. The diesel particulate filter according to claim 5 wherein said inorganic filler comprises a texturized ceramic yarn.

7. The diesel particulate filter according to claim 6 wherein said ceramic yarn comprises an alumina-boria-silica ceramic.

8. The diesel particulate filter according to claim 5 wherein said filler further comprises up to about 30 percent heat-fugitive yarn, based on the total volume of said inorganic filler and said heat fugitive yarn.

9. The diesel particulate filter according to claim 1 wherein said means for restricting said flow of exhaust along said channels between said tubes comprises an inorganic filler, said inorganic filler filling at least a portion of each of said channels within a layer of said plurality of tubes.

10. The diesel particulate filter according to claim 9 further comprising inorganic stuffer in said channels between layers of said tubes, said inorganic stuffer being present only at one end of said filtering element.

11. The diesel particulate filter according to claim 10 wherein said inorganic stuffer comprises an inorganic nonwoven mat.

12. The diesel particulate filter according to claim 11 wherein said nonwoven mat is a filter.

13. The diesel particulate filter according to claim 11 wherein said nonwoven mat comprises ceramic microfibers.

14. The diesel particulate filter according to claim 13 wherein said ceramic microfibers comprise an alumina-boria-silica ceramic.

15. The diesel particulate filter according to claim 1 wherein said means for restricting the flow of exhaust along channels between said filtering element and said casing comprises an intumescent mat.

16. The diesel particulate filter according to claim 1 further comprising an inorganic warp perpendicular to the longitudinal axis of said parallel tubes.

17. The diesel particulate filter according to claim 16 wherein said inorganic warp comprises inorganic yarn.

18. The diesel particulate filter according to claim 17 further comprising an organic warp perpendicular to the longitudinal axis of said parallel tubes.

19. The diesel particulate filter according to claim 1 further comprising a pressure-sensitive sheet material between layers of said tubes.

20. The diesel particulate filter according to claim 1 further comprising an oxidation catalyst coated onto said inorganic yarn.

21. The diesel particulate filter according to claim 1 wherein said inorganic yarn comprises a ceramic yarn.

22. The diesel particulate filter according to claim 21 wherein said ceramic yarn is texturized.

23. The diesel particulate filter according to claim 22 wherein said ceramic yarn comprises alumina-boria-silica ceramic.

24. A diesel particulate filter comprising
 (a) a casing having an inlet end and an outlet end;
 (b) means for connecting said ends of said casing to an exhaust system; and
 (c) a filtering element substantially radially filling said casing, said filtering element comprising
  (i) a continuous hollow tube comprising one of woven, braided, or knitted inorganic yarn, said tube being folded in a zig-zag pattern to provide a layer comprising a plurality of parallel tube segments, wherein ends of said tube segments are defined by folds, said layer being spirally wound such that said ends of said tube segments extend between said ends of said casing, and
  (ii) means for restricting flow of exhaust along channels between adjacent ones of said parallel tube segments and between said filtering element and said casing.

25. The diesel particulate filter according to claim 24 wherein said means for restricting said flow of exhaust along said channels between said tube segments comprises an inorganic filler, said inorganic filler filling the length of said channels within said layers.

26. The diesel particulate filter according to claim 25 wherein said inorganic filler comprises a texturized ceramic yarn.

27. The diesel particulate filter according to claim 26 wherein said ceramic yarn comprises alumina-boria-silica ceramic.

28. The diesel particulate filter according to claim 24 wherein said means for restricting said flow of exhaust along said channels between said tube segments comprises an inorganic filler, said inorganic filler filling at least a portion of each of said channels within said layer.

29. The diesel particulate filter according to claim 28 further comprising inorganic stuffer in a portion of said channels between layers of said spirally wound layer of said tube segments, said inorganic stuffer being present only at one end of said filtering element.

30. The diesel particulate filter according to claim 29 wherein said inorganic stuffer comprises an inorganic nonwoven mat.

31. The diesel particulate filter according to claim 30 wherein said nonwoven mat comprises ceramic microfibers.

32. The diesel particulate filter according to claim 31 wherein said ceramic microfibers comprise alumina-boria-silica ceramic.

33. The diesel particulate filter according to claim 24 wherein said means for restricting the flow of exhaust along channels between said filtering element and said casing comprises an intumescent mat.

34. The diesel particulate filter according to claim 24 wherein said inorganic yarn comprises ceramic yarn.

35. The diesel particulate filter according to claim 34 wherein said ceramic yarn is texturized.

36. The diesel particulate filter according to claim 33 wherein said ceramic yarn comprises alumina-boria-silica ceramic.

37. The diesel particulate filter according to claim 24 further comprising an oxidation catalyst coated onto said inorganic yarn.

38. A diesel particulate filter comprising
 (a) a casing having an inlet end and an outlet end;
 (b) means for connecting said ends of said casing to an exhaust system; and
 (c) a filtering element substantially radially filling said casing, said filtering element comprising
  (i) a plurality of parallel, hollow tubes, each tube comprising one of woven braided, or knitted inorganic yarn, said tubes extending between said ends of said casing in layers, said tubes being open at one of said inlet and said outlet end of said casing, and said tubes being blocked at one of said outlet end and said inlet end of said casing; and
  (ii) means for restricting flow of exhaust along channels between adjacent ones of said parallel tubes and between said filtering element and said casing, wherein said means for restricting flow provides filtration of exhaust.

39. The diesel particulate filter according to claim 38 wherein all of said tubes are open at said outlet end of said casing and wherein all of said tubes are blocked at said inlet end of said casing.

40. The diesel particulate filter according to claim 38 wherein said means for restricting said flow of exhaust along said channels between said tubes comprises an inorganic filler, said inorganic filler filling the length of said channels within a layer of said plurality of tubes.

41. The diesel particulate filter according to claim 40 wherein said inorganic filler comprises a texturized ceramic yarn.

42. The diesel particulate filter according to claim 41 wherein said ceramic yarn comprises alumina-boria-silica ceramic.

43. The diesel particulate filter according to claim 38 wherein said means for restricting said flow of exhaust along said channels between said tubes comprises an inorganic filler, said inorganic filler filling at least a portion of each of said channels within a layer of said plurality of tubes.

44. The diesel particulate filter according to claim 43 further comprising inorganic stuffer in said channels between layers of said tubes, said inorganic stuffer being present only at one end of said filtering element.

45. The diesel particulate filter according to claim 44 wherein said inorganic stuffer comprises an inorganic nonwoven mat.

46. The diesel particulate filter according to claim 45 wherein said nonwoven mat comprises ceramic microfibers.

47. The diesel particulate filter according to claim 46 wherein said ceramic microfibers comprise alumina-boria-silica ceramic.

48. The diesel particulate filter according to claim 38 wherein said means for restricting the flow of exhaust along channels between said filtering element and said casing comprises an intumescent mat.

49. The diesel particulate filter according to claim 38 wherein said inorganic yarn comprises ceramic yarn.

50. The diesel particulate filter according to claim 49 wherein said ceramic yarn is texturized.

51. The diesel particulate filter according to claim 50 wherein said ceramic yarn comprises alumina-boria-silica ceramic.

52. The diesel particulate filter according to claim 38 further comprising an oxidation catalyst coated onto said inorganic yarn.

* * * * *

UNITED STATES PATENT AND TRADEMARK OFFICE
CERTIFICATE OF CORRECTION

PATENT NO. : 5,174,969

DATED : December 29, 1992

INVENTOR(S) : Edward M. Fischer et al.

It is certified that error appears in the above-identified patent and that said Letters Patent is hereby corrected as shown below:

Column 12, line 8, "woven braided" should read --woven, braided--.

Column 12, line 11, after "inlet" and before "and" add --end--.

Signed and Sealed this

Twenty-first Day of December, 1993

Attest:

BRUCE LEHMAN

Attesting Officer

Commissioner of Patents and Trademarks